United States Patent
Yun et al.

(10) Patent No.: US 9,270,132 B2
(45) Date of Patent: Feb. 23, 2016

(54) BALANCING METHOD AND BATTERY SYSTEM

(71) Applicant: Samsung Electronics Co., Ltd., Suwon-Si, Gyeonggi-Do (KR)

(72) Inventors: Jae-jung Yun, Hwaseong-si (KR); Jang-pyo Park, Busan (KR); Tae-jung Yeo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 370 days.

(21) Appl. No.: 13/755,245

(22) Filed: Jan. 31, 2013

(65) Prior Publication Data

US 2014/0084868 A1     Mar. 27, 2014

(30) Foreign Application Priority Data

Sep. 21, 2012    (KR) ........................ 10-2012-0105245

(51) Int. Cl.
*H02J 7/00*       (2006.01)
(52) U.S. Cl.
CPC ............. *H02J 7/0063* (2013.01); *H02J 7/0016* (2013.01); *Y02T 10/7055* (2013.01)
(58) Field of Classification Search
CPC ........................... H02J 7/0063; B06L 11/1866
USPC ........................................................ 320/118
See application file for complete search history.

(56) References Cited

U.S. PATENT DOCUMENTS

| | | | |
|---|---|---|---|
| 8,232,768 B2 * | 7/2012 | Hou et al. ...................... | 320/121 |
| 2010/0019724 A1 * | 1/2010 | Mizutani et al. ............... | 320/118 |
| 2010/0244781 A1 | 9/2010 | Kramer et al. | |
| 2011/0115436 A1 * | 5/2011 | Zhang et al. ................... | 320/134 |
| 2011/0163728 A1 | 7/2011 | Sutardja et al. | |
| 2012/0038323 A1 | 2/2012 | Densham et al. | |
| 2012/0274283 A1 * | 11/2012 | van Lammeren ............. | 320/118 |

FOREIGN PATENT DOCUMENTS

KR     1020110028343 A     2/2010

(Continued)

OTHER PUBLICATIONS

Park, Hong-Sun et al., "Design of a Charge Equalizer Based on Battery Modularization", IEEE Transactions on Vehicular Technology, vol. 58, No. 7, Sep. 2009.

(Continued)

*Primary Examiner* — Sun Lin
(74) *Attorney, Agent, or Firm* — Harness, Dickey & Pierce, P.L.C.

(57) ABSTRACT

According to an example embodiment, a battery system includes: a plurality of modules, each including a plurality of cells connected to each other in series and a cell balancing circuit performing a balancing operation between the plurality of the cells based on voltages of the plurality of the cells; and a module balancing circuit performing a balancing operation between the modules based on voltages of the modules.

15 Claims, 13 Drawing Sheets

(56) References Cited

FOREIGN PATENT DOCUMENTS

| KR | 1020100029058 A | 3/2010 |
|---|---|---|
| KR | 1020120011363 A | 7/2010 |
| KR | 1020100112530 A | 10/2010 |
| KR | 1020110102094 A | 9/2011 |
| KR | 1020110138829 A | 12/2011 |
| KR | 1020120016993 A | 2/2012 |
| KR | 1020120038267 A | 4/2012 |
| WO | WO-2010018644 A1 | 2/2010 |

OTHER PUBLICATIONS

Zhi-Guo, Kong et al., Comparison and Evaluation of Charge Equalization Technique for Series Connected Batteries, ISSN: 0275-9306, Oct. 23, 2006.

Moore, Stephen W. et al., A Review of Cell Equalization Methods for Lithium Ion and Lithium Polymer Battery Systems, Society of Automotive Engineers, 2001.

Mar. 19, 2015 US Office Action issued in related U.S. Appl. No. 13/743,764.

* cited by examiner

BALANCING METHOD AND BATTERY SYSTEM

CROSS-REFERENCE TO RELATED APPLICATIONS

This application claims priority under 35 U.S.C. §119 to Korean Patent Application No. 10-2012-0105245, filed on Sep. 21, 2012, in the Korean Intellectual Property Office, the disclosure of which is incorporated herein in its entirety by reference.

BACKGROUND

1. Field

Some example embodiments relate to methods of balancing cells and/or modules included in a battery system, and/or battery systems.

2. Description of the Related Art

A battery may be configured by connecting stacks, in which a plurality of single cells are connected in series, in parallel with each other in order to obtain a high voltage and a large capacity. The plurality of cells ideally all have the same characteristics as each other; however, deviations between cells (e.g., differences in capacities and/or impedances) may occur due to technical and economical factors when fabricating the cells. Such deviations may increase when the cells have temperature differences and/or the number of charging or discharging operations increase. Due to the deviations between cells, cells having less capacities may be over-charged or over-discharged during a charging or discharging operation, and thus, a balancing operation for balancing voltages of the cells may be done.

SUMMARY

Some example embodiments relate to balancing methods for reducing a difference between voltages of cells, methods for reducing a difference between voltages of modules including a plurality of cells, and/or battery systems.

Additional aspects will be set forth in part in the description which follows and, in part, will be apparent from the description, or may be learned by practice of example embodiments.

According to an example embodiment, a battery system includes: a plurality of modules, each of the plurality of modules including a plurality of cells connected in series and a cell balancing circuit; and a module balancing circuit. The cell balancing circuit is configured to measure voltages of the plurality of cells. The cell balancing circuit is configured to select a first number of the plurality of cells for cell balancing based on the voltages of the plurality of cells. The module balancing circuit is configured measure voltages of the plurality of modules. The module balancing circuit is configured to select a second number of the plurality of modules for module balancing based on the voltages of the plurality of modules.

According to another example embodiment, a balancing method of a battery system includes: selecting a first number of a plurality of modules for module balancing based on voltages of a plurality of modules; balancing the selected modules by controlling turning on and turning off switches that are connected to the selected modules; selecting a second number of the plurality of cells for cell balancing based on voltages of the cells included in the modules; and balancing the selected cells by controlling turning on and turning off switches that are connected to the selected cells. Each of the plurality of modules includes a plurality of cells connected in series.

According to another example embodiment, a battery system includes: a plurality of modules that are connected to each other, the plurality of modules each including a plurality of cells that are connected to each other and a cell balancing circuit, the cell balancing circuit being configured to select a first number of the plurality of cells for cell balancing; and a module balancing circuit configured to select a second number of the plurality of modules for module balancing. The module balancing circuit is configured to determine the selected modules based on measuring voltages of the plurality of modules. The module balancing circuit is configured to bi-directionally transfer energy between the selected modules.

The plurality of cells may be connected in series. The cell balancing circuit may include a plurality of switch units and a plurality of energy storage devices. The plurality of switch units may each include two switches that are connected respectively to opposite terminals of one pair of adjacent cells among pairs of adjacent cells in the plurality of cells. The energy storage devices may be connected respectively between the plurality of switch units and the pairs of adjacent cells.

The plurality of modules may be connected in series. The module balancing circuit may include a plurality of bi-directional switches that are respectively connected to the plurality of modules, a module controller, and a multi-winding transformer. The bi-directional switches may be configured to bi-directionally control a flow of an electric current. The module controller may be configured to determine the selected modules for module balancing based on the voltages of the plurality of modules. The module controller may be configured to turn on and turn off a selected number of the bi-directional switches that are connected to the selected modules. The multi-winding transformer may be connected to the bi-directional switches. The multi-winding transformer may be configured to transfer energy between the selected modules if a selected number of the bi-directional switches are turned on. The selected number of bi-directional switches may correspond to the selected modules.

The module balancing circuit may be configured to determine the selected modules based on selecting a module having a highest voltage and selecting a module having a lowest voltage among the plurality of modules.

The cell balancing circuit of at least one of the plurality of modules may be configured to transfer energy between the selected cells while the module balancing circuit transfers energy between the selected modules.

BRIEF DESCRIPTION OF THE DRAWINGS

These and/or other aspects will become apparent and more readily appreciated from the following description of non-limiting embodiments, taken in conjunction with the accompanying drawings in which like reference characters refer to the same parts throughout the different views. The drawings are not necessarily to scale, emphasis instead being placed upon illustrating principles of example embodiments. In the drawings.

DETAILED DESCRIPTION

Figure 1:
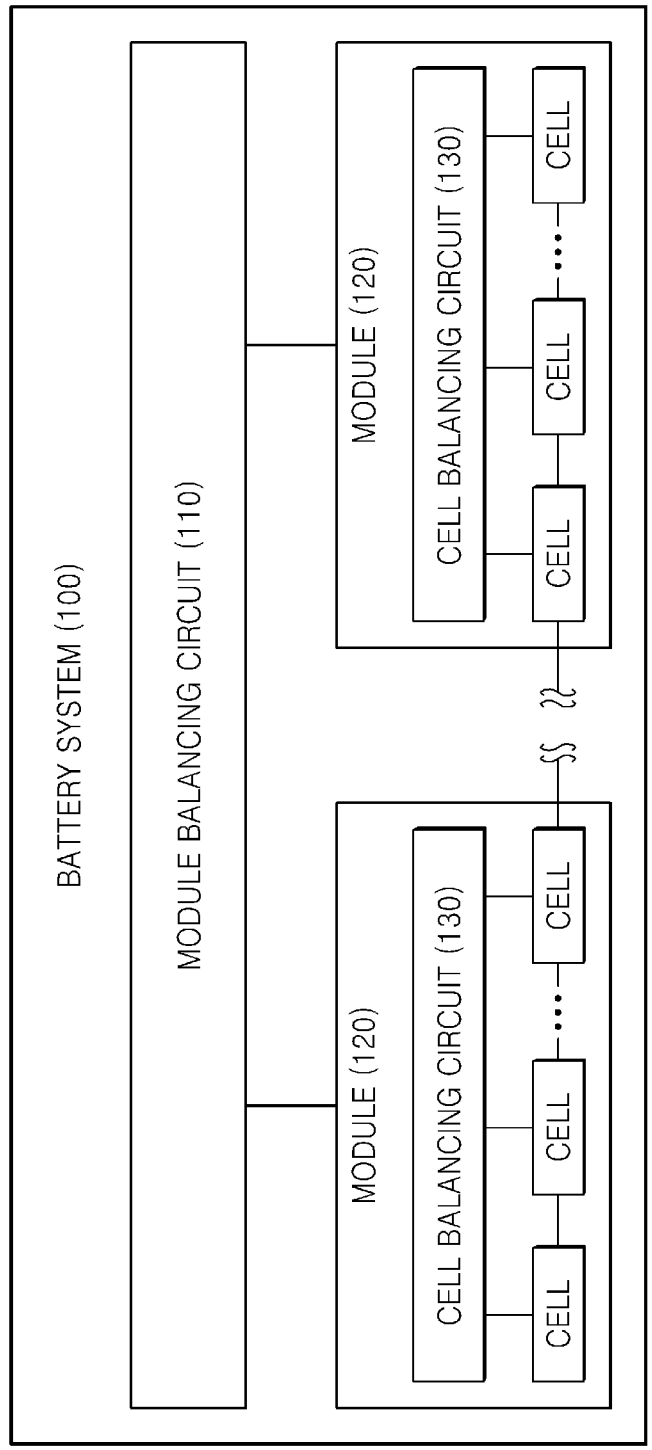
FIG. 1 is a diagram of a battery system according to an example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and regions are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a diagram showing a battery system 100 according to an example embodiment. Referring to FIG. 1, the battery system 100 includes a module balancing circuit 110 and a plurality of modules 120. A plurality of cells may store energy, and the plurality of cells may be reused after being recharged. When charging or discharging the battery system 100, a voltage difference may occur between the plurality of cells included in the battery system 100, and a voltage difference may occur between the modules 110.

The module balancing circuit 110 is connected to the modules 120 included in the battery system 100. Here, the modules 120 are connected to each other in series.

The module balancing circuit 110 may perform balancing between the plurality of modules included in the battery system 100. The module balancing circuit 110 may measure voltages of the modules 120, and may select the modules 120 that are to be balanced based on the measured voltages. The module balancing circuit 110 may perform the balancing between the selected modules 120 by controlling turning on and turning off of switches.

Each of the modules 120 include a plurality of cells and a cell balancing circuit 130. The modules 120 include a desired (and/or alternatively predetermined) number of cells included in the battery system 100. The number of cells included in one module 120 may be determined for managing the cells efficiently.

If a voltage difference occurs between the cells, the cell balancing circuit 130 may perform a balancing operation between the cells. That is, the cell balancing circuit 130 may reduce the voltage difference between cells and the balancing circuit 130 may make the cells have voltages that are more equal to each other. In an ideal case, since the cells have the same characteristics, the voltages of the cells are equal to each other during the charging or discharging. However, differences between capacities and/or impedances of the cells may occur. The differences of characteristics between the cells may cause over-charging or over-discharging of some cells. Therefore, if there is a voltage difference between the cells during the charging or discharging operation, the cell balancing circuit 130 may balances the voltages of the cells that have different voltages. For example, the cell balancing circuit 130 may transfer energy from a cell having a higher voltage to a cell having a lower voltage in order to balance the voltages of the two cells. In addition and/or alternatively, the cell balancing circuit 130 may perform the balancing operation by consuming the voltage of the cell having the higher voltage.

The cell balancing circuit 130 may periodically measure the voltages of the cells and perform the balancing operation on selected cells based on the measured voltages. For example, the cell balancing circuit 130 may compare the largest voltage and the lowest voltage among the measured voltages and if a difference between the largest voltage and the lowest voltage is greater than a desired (and/or alternatively predetermined) threshold value, the cell balancing circuit 130 may balance voltages of the cells that have the largest voltage and the lowest voltage respectively.

FIG. 1 shows elements of a battery system 100 according to an example embodiment. However, one of ordinary skill in the art would understand that other universal elements than the elements shown in FIG. 1 may be used.

Figure 2:
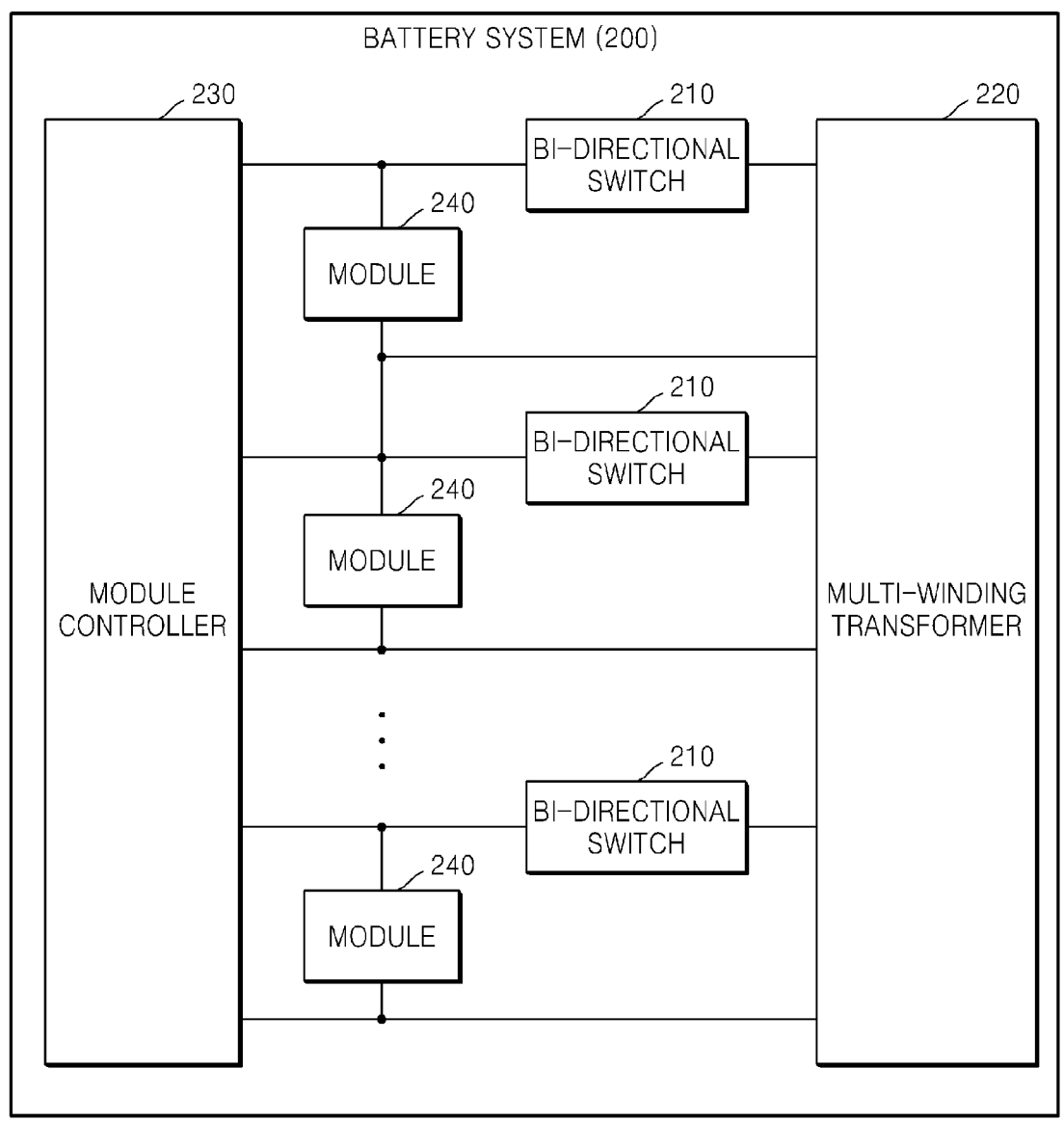
FIG. 2 is a diagram of a battery system according to an example embodiment.

FIG. 2 is a diagram showing an example of the battery system 100 of FIG. 1. According to an example embodiment, a battery system 200 may perform a balancing operation between modules 240 by using a multi-winding transformer 220.

The battery system 200 includes a plurality of modules 240 and the module balancing circuit 110. The module balancing circuit 110 includes a voltage measuring unit (not shown), bi-directional switches 210, a multi-winding transformer 220, and a module controller 230. The battery system 200 may balance voltages between modules 240 shown in FIG. 2, and at the same time, performs the balancing of the cells included in each of the modules 240. In FIG. 2, an example of performing the balancing between the modules 240 by the module balancing circuit 110 will be described, and an example of performing the balancing between the cells included in each of the modules 240 by the cell balancing circuit 130 will be described with reference to FIG. 3.

Since the module balancing circuit 110 and the cell balancing circuit 130 respectively may perform the balancing operations between the modules 240 and the cells included in each module 240 in the battery system 200, the balancing operation may be performed within a short period of time, and even when a lot of cells are included in the battery system 200, the cells may be controlled easily. Here, the balancing between the cells may be performed independently in each of the modules 240.

The bi-directional switches 210 are located between the modules 240 and the multi-winding transformer 220. The bi-directional switches 210 may be connected each of the modules 240 respectively. Also, the module controller 230 may turn on and turn off the bi-directional switches 210.

The bi-directional switches 210 may control a flow of electric current flowing in opposite directions. That is, electric current flowing in the bi-directional switches 210 may flow from the module 240 to the multi-winding transformer 220 or from the multi-winding transformer 220 to the module 240, according to conditions.

The multi-winding transformer 220 is connected to the bi-directional switch 210. The multi-winding transformer 220 may transfer energy between the modules 240.

The multi-winding transformer 220 includes mutual inductors connected to the modules 240. The mutual inductors of the multi-winding transformer 220 are correlated with each other. Thus, the modules 240 may transmit and/or receive energy to and/or from each other via the mutual inductors that are connected thereto. Therefore, the energy stored in one module 240 may be transferred directly to the other module. Since the energy may be transferred from one cell to the other cell without passing through a circuit unnecessarily, an energy transferring efficiency may be high. For example, the mutual inductors included in the multi-winding transformer 220 may have the same number of windings.

The module controller 230 may select the modules 240 to be balanced based on the voltages of the modules 240, and controls turning on and/or turning off of bi-directional switches 210 that are connected to the selected modules 240. For example, the modules 240 selected for balancing may be the modules 240 having the largest voltage difference therebetween. That is, the module controller 230 may select the module 240 having the largest voltage and the module 240 having the lowest voltage. The module controller 230 may control the bi-directional switches 210 of the selected modules 240 for one period.

The module controller 230 may select the modules 240 that need to be balanced based on a desired (and/or alternatively predetermined) priority. As described above, selecting the module having the highest voltage and the module 240 having the lowest voltage is an example of a desired (and/or alternatively predetermined) priority. For example, the module controller 230 may set which modules 240 are selected and balanced in advance based on the measured voltages and select modules 240 for balancing according to the set priority.

For example, if two or more modules 240 have the same voltages as each other, the module controller 230 may select the modules 240 based on an order of the modules 240. That is, the module controller 230 may assign numbers to the modules 240 in a connecting order, and may select the module 240 having a smaller number. If a third module and a fourth module show the highest voltage and a seventh module shows the lowest voltage, the module controller 230 may select one of the third and fourth modules to be balanced with the seventh module. Here, if the module having the smaller number has the priority, the module controller 230 may select the third and seventh modules and control the switches of the third and seventh modules.

The module controller 230 may select the modules 240 for balancing when a voltage difference therebetween is equal to a desired (and/or alternatively predetermined) critical value or greater.

The module controller 230 may be implemented by a processor of a computer. For example, the module controller 230 may be a program realized in hardware capable of processing calculations or algorithms.

The voltage measuring unit (not shown) may measure voltages of the modules 240 and the cells, and outputs the measured voltages of the modules and cells to the module balancing circuit 110 and the cell balancing circuit 130 respectively.

Figure 3:
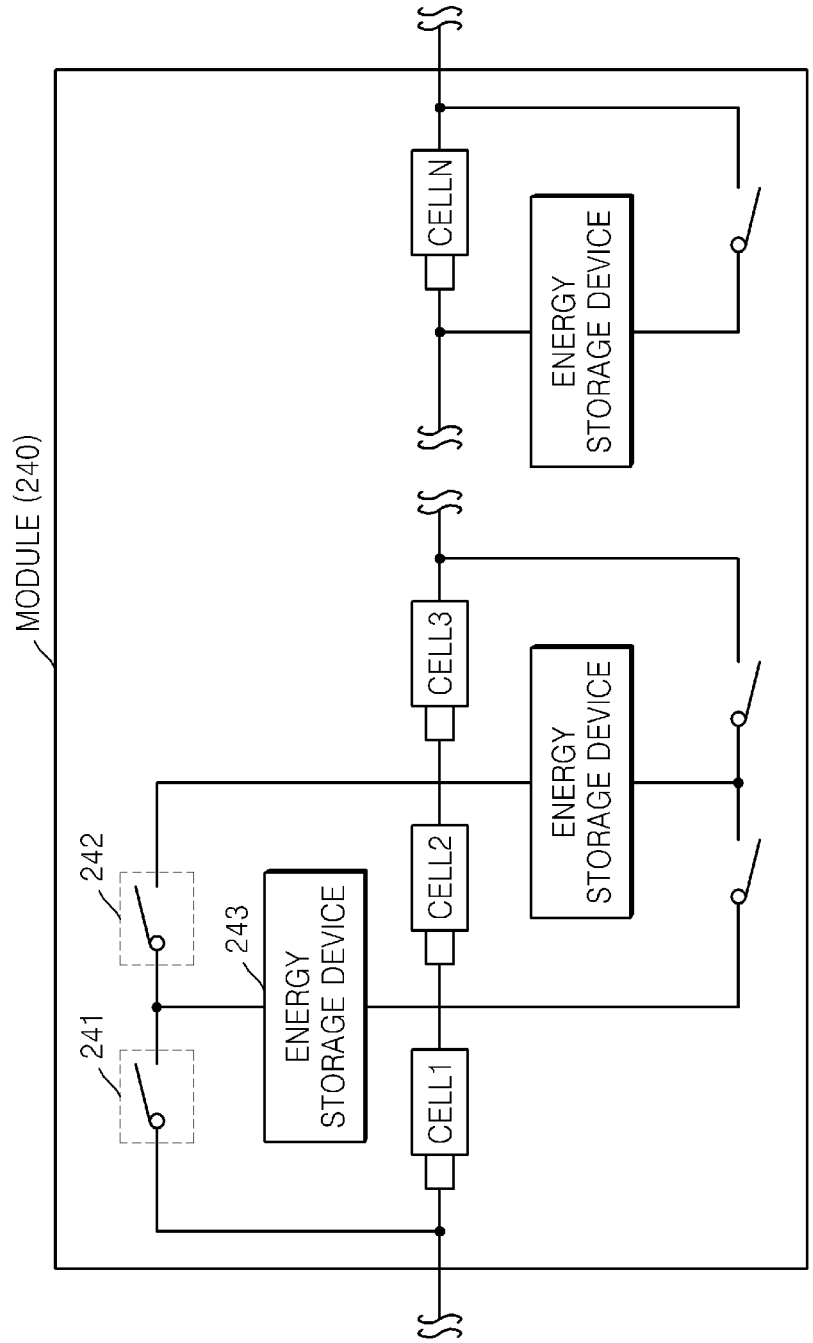
FIG. 3 is a diagram of a module shown in FIG. 2.

FIG. 3 is a diagram showing an example of the module 240 shown in FIG. 2. Referring to FIG. 3, the battery system 200 may perform balancing between a selected number of the cells (cell 1 through cell N) included in the module 240 by using a bidirectional buck-boost converter. However, example embodiments are not limited thereto.

The module 240 includes the cell balancing circuit 130 and the cells 1 through N. The cell balancing circuit 130 includes a voltage measuring unit (not shown), a cell controller (not shown), switches, and energy storage devices.

The voltage measuring unit may measure voltages of the cells 1 through N, and outputs the measured voltages to the cell controller.

The cell controller is connected to the voltage measuring unit and all the switches connected to the cells 1 through N. The cell controller receives voltages of the cells 1 through N from the voltage measuring unit. The cell controller may control turning on and/or turning off of all switches.

The cell controller may perform the balancing on a selected number of the cells 1 through N based on the voltages of the cells 1 through N. The cell controller may select two adjacent cells having different voltages from each other based on the voltages of the cells 1 through N input from the voltage measuring unit, and controls the turning on and turning off of the switches connected to the selected cells. The cell controller may select the cells, a voltage difference of which is equal to or greater than a desired (and/or alternatively predetermined) threshold value.

An example where the controller balances energy (e.g., voltage) between cell 1 and a cell 2 will be described; however, the controller is not limited to selecting cell 1 and cell 2 for balancing. The cell controller turns on a switch 241 connected to the cell 1 having a higher voltage between the selected cells 1 and 2. When the switch 241 connected to the cell 1 is turned on, energy stored in the cell 1 is transferred to an energy storage device 243 via the switch 241. After that, the cell controller turns off the switch 241, and turns on a switch 242. When the switch 242 is turned on, the energy stored in the energy storage device 243 is transferred to the cell 2. Therefore, the cell controller may perform the balancing between adjacent cells by controlling the switches of the adjacent cells (cells 1 and 2) for one period. The energy storage device 243 may be an inductor, a capacitor (or capacitor array), or a battery. However, example embodiments are not limited thereto.

The cell controller performs the balancing operation with respect to all of the cells (cells 1 through N) in the module 240 so that the cells 1 through N have the same (and/or more equal) voltage values as each other.

The cell controller may be implemented by a processor of a computer. For example, the cell controller may be a program realized in hardware capable of processing calculations or algorithms.

The switches included in the module 240 are connected respectively to the cells in parallel, and each of the switches is connected to the switch connected to the adjacent cell in series. Also, the energy storage devices are connected between the switches connecting to the adjacent cells and between the cells.

Figure 4:
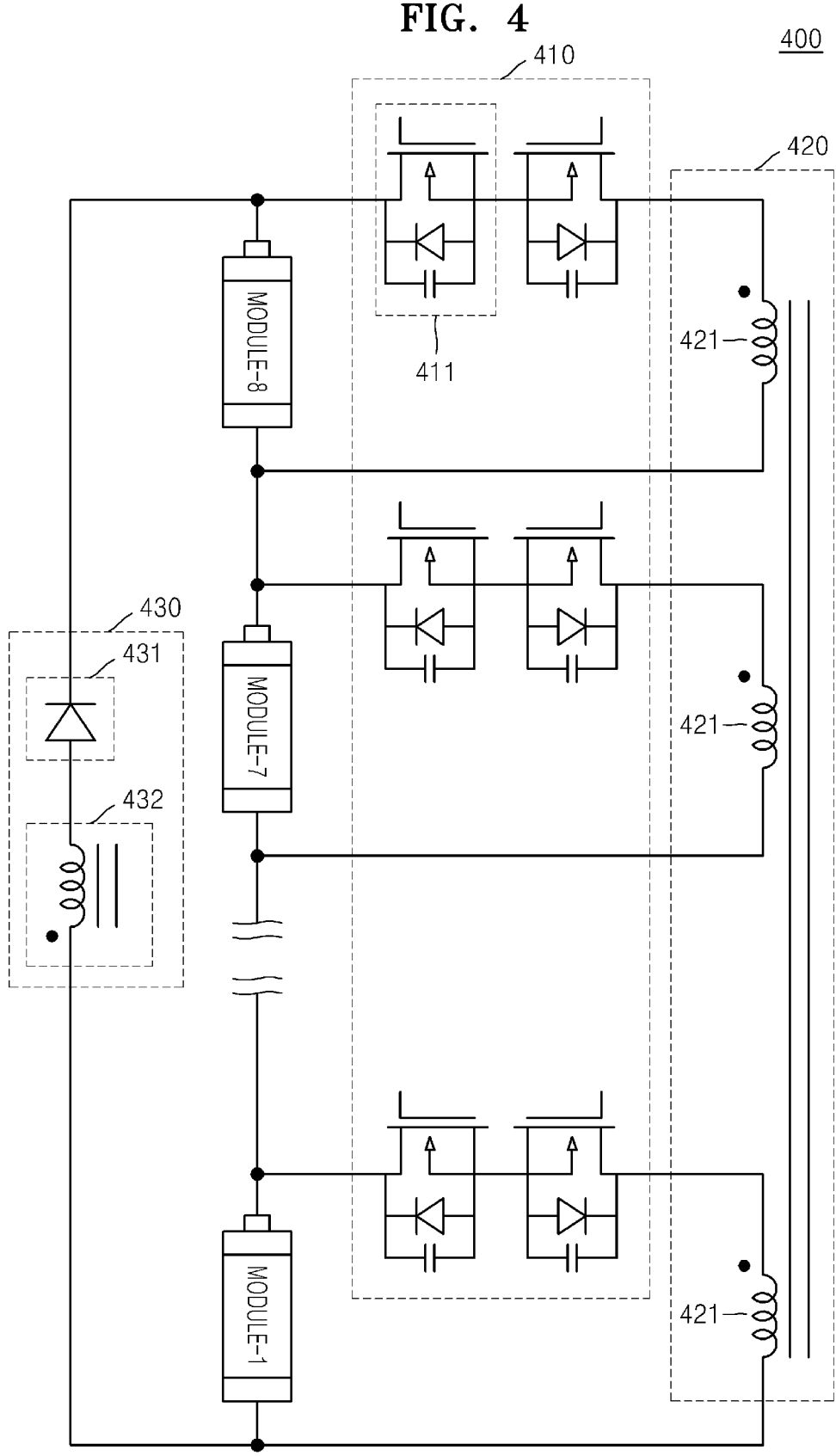
FIG. 4 is a diagram of a battery system according to an example embodiment.

FIG. 4 is a diagram showing a battery system 400 according to an example embodiment. Battery system 400 of FIG. 4 includes eight modules (module-1 through module-8); however, example embodiments are not limited thereto.

The battery system 400 further includes a reset circuit 430 and a multi-winding transformer 420 having inductors 421. The reset circuit 430 may reset the energy stored in a mutual inductor 421 of the multi-winding transformer 420. A mutual inductor 421 of the multi-winding transformer 420 may store some energy while transferring the energy between the modules (module-1 through module-8), and the reset circuit 430 may receive the energy stored in the mutual inductor 421 of the multi-winding transformer 420. The reset circuit 430 may transfer the received energy to the entire modules.

The reset circuit 430 may include a diode 431 and a mutual inductor 432 that is connected to opposite terminals of all of the modules (module-1 through module-8) and correlated with the mutual inductors 421 of the multi-winding transformer 420. The mutual inductor 432 of the reset circuit 430 may be correlated with the mutual inductors 421 of the multi-winding transformer 420, and the mutual inductor 432 may have a polarity that is opposite to the polarities of the mutual inductors 421 in the multi-winding transformer.

Bi-directional switches 410 are connected between the modules and the multi-winding transformer 420 respectively. A bi-directional switch 410 may include two synchronous rectifier-N-channel metal oxide semiconductors (SR-NMOSs) 411, which face each other. The bi-directional switches 410 are connected to each of the modules in parallel.

The SR-NMOS 411 includes a built-in diode and a capacitor. The built-in diode and the capacitance component are included during processes of generating the SR-NMOS 411.

The multi-winding transformer 420 includes mutual inductors 421 that may be respectively connected to the modules in parallel. The mutual inductors 421 have the same polarities as each other. The mutual inductors 421 are correlated to each other and the multi-winding transformer 420 may transfer energy one module to another via the mutual inductors 421.

When voltages at the opposite terminals of the mutual inductor 421 in the multi-winding transformer 420 increase, voltages at the opposite terminals of the mutual inductor 432 of the reset circuit 430 also increase. If the voltage of the mutual inductor 432 is greater than the voltage at the opposite terminals of all of the modules, the electric current flows in the reset circuit 430. When the electric current flows in the reset circuit 430, the voltage at the opposite terminals of the mutual inductor 421 of the multi-winding transformer 420 does not increase, but maintains a constant level. The number of windings of the mutual inductor 432 of the reset circuit 430 may be greater than the number of windings in mutual inductors 421 of the multi-winding transformer 420. The peak voltage at the opposite terminals of the bi-directional switch 410 may be controlled by adjusting the number of windings of mutual inductors 421 of the multi-winding transformer 420 and the reset circuit 430.

FIGS. 5 through 8 are diagrams illustrating operations of the battery system 400 shown in FIG. 4. FIGS. 5 through 8 describe operations of two selected modules module-1 and module-8 according to turning on/turning off of the switch. Here, the module module-8 has a higher voltage and the module module-1 has a lower voltage. Therefore, energy of the module module-8 is transferred to the module module-1. However, module-1 and module-8 are only described as an example, and one of ordinary skill in the art would appreciate that modules other than module-1 and module-8 may be selected for the operations in FIGS. 5-8.

Figure 5:
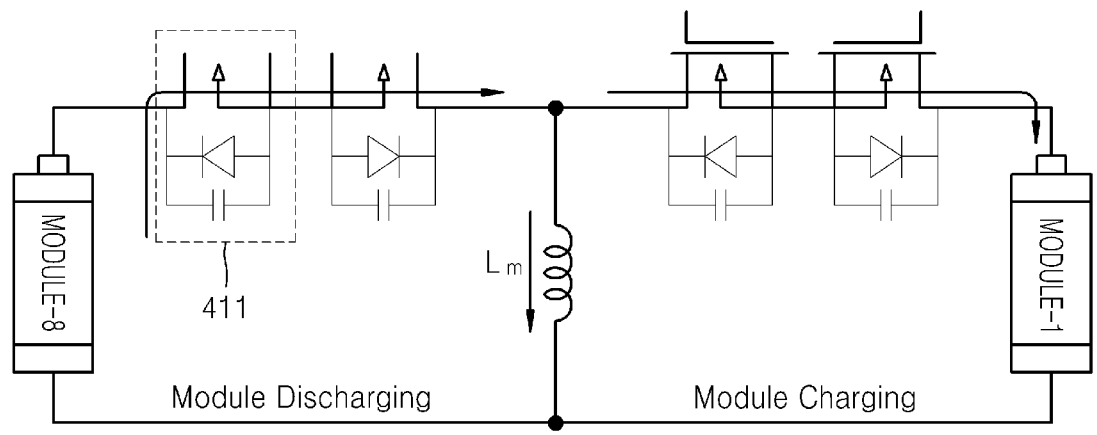
FIGS. 5 through 8 are diagrams illustrating operations of the battery system shown in FIG. 4.

FIG. 5 shows a case where the bi-directional switches 410 of the two modules module-1 and module-8 are in turned on states. When the bi-directional switches 410 of the two modules module-1 and module-8 are closed by the module controller (not shown), the two modules module-1 and module-8 configure a circuit as shown in FIG. 5. The electric current flows from the module module-8 having the higher voltage to a mutual inductance Lm and the module module-1. The module module-8 is discharged, the module module-1 is charged, and the mutual inductance Lm stores energy. Therefore, a voltage difference between the two modules module-1 and module-8 is reduced, and the two modules module-1 and module-8 afterward may have the same (and/or more equal) voltages as each other. Here, in order to transfer most of the energy in the module module-8 to the module module-1, an impedance of the mutual inductance Lm is greater than an impedance of a module.

Also, since the bi-directional switch 410 may include two SR-NMOSs 411, when the bi-directional switch 410 is in a turned on state, the electric current only flows through a resistance in the switch-on state of the SR-SMOS 411 without passing through the built-in diode, and thus, a conduction loss and a voltage drop due to the built-in diode are reduced.

Figure 6:
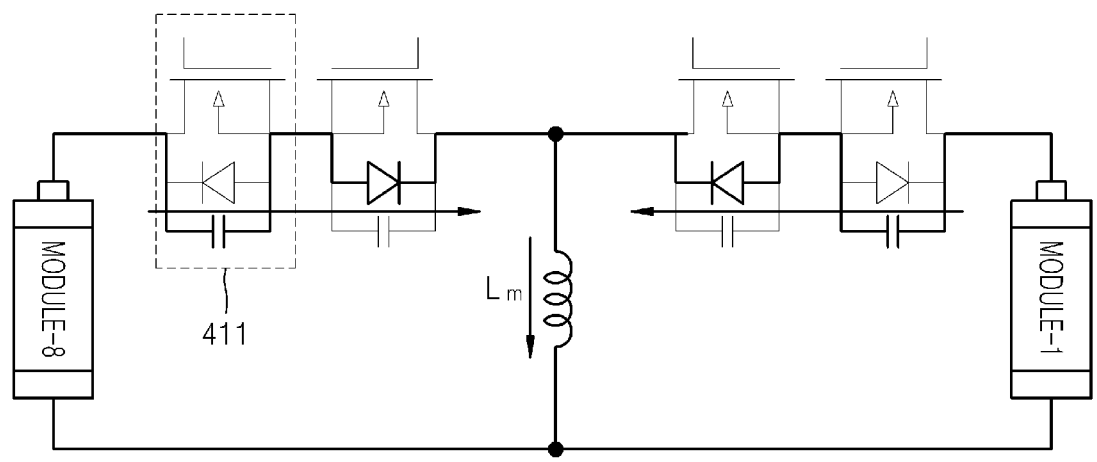
Figure 7:
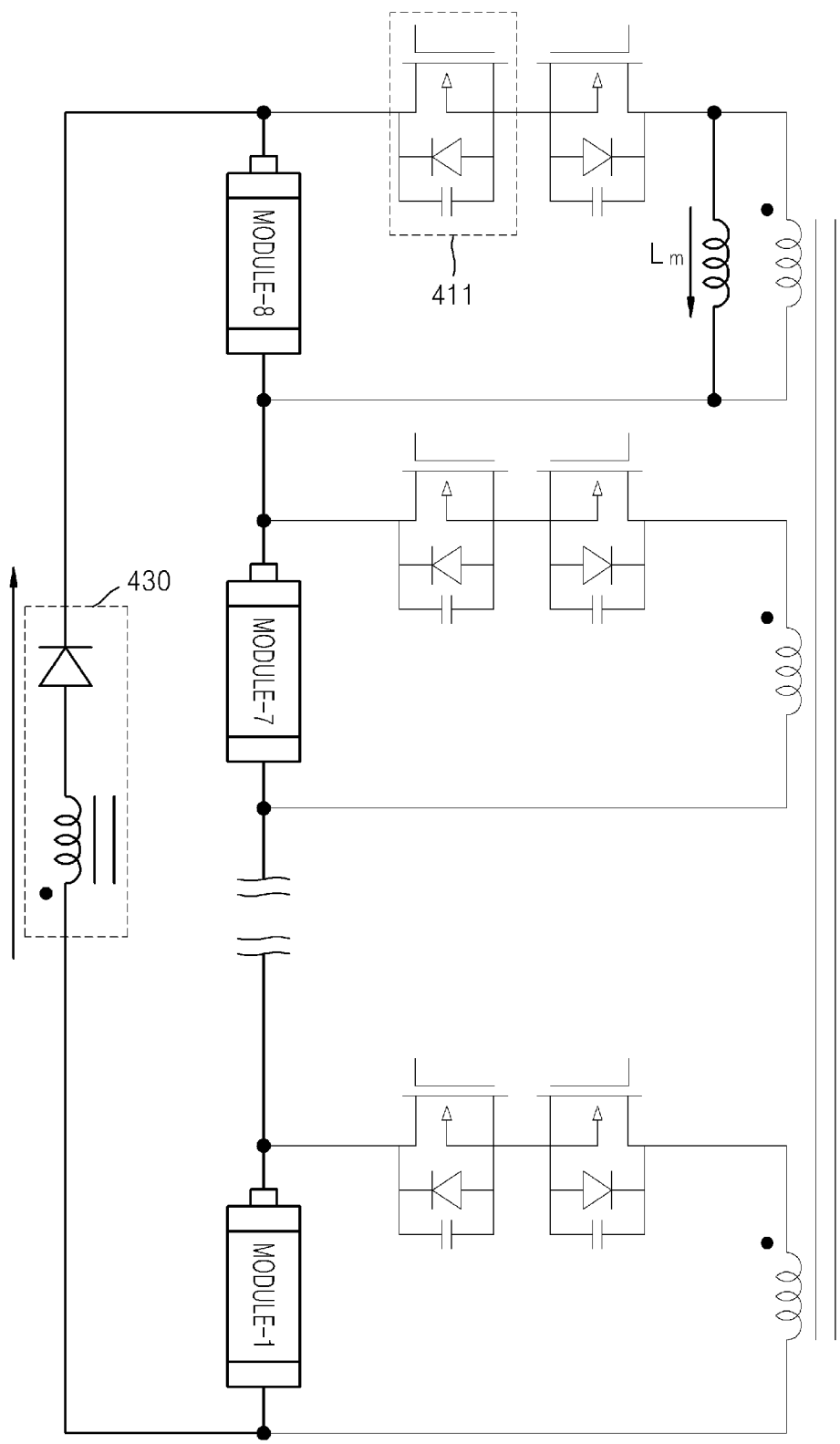
Figure 8:
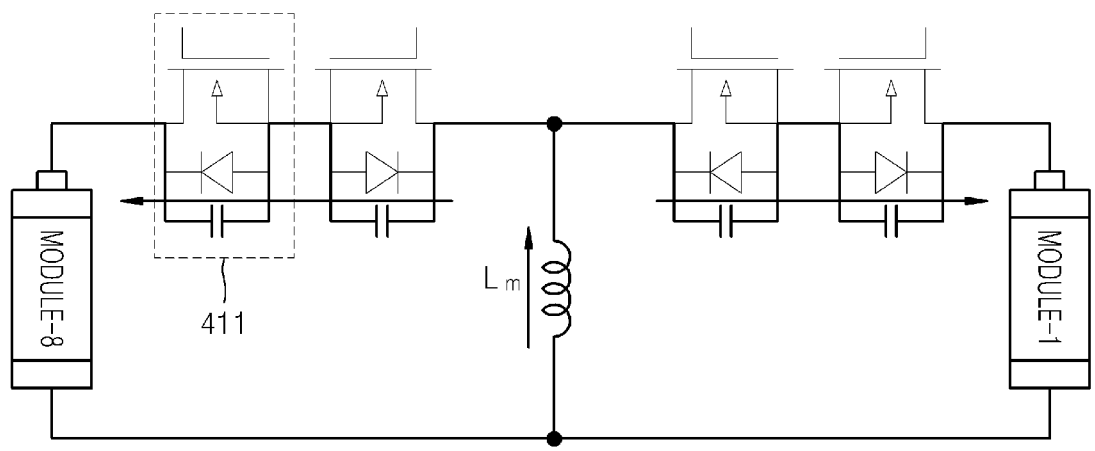

FIGS. 6 through 8 are diagrams illustrating a case where the bi-directional switches 410 of the two modules module-1 and module-8 are in turned off states.

FIG. 6 is an equivalent circuit diagram in a case where the bi-directional switches 410 of the two modules module-1 and module-8 are changed to off states from on states. When the bi-directional switches 410 of the two modules module-1 and module-8 are turned off, a resonant circuit is formed between an output capacitor of the SR-SMOS 411 and the mutual inductance Lm. Therefore, the voltage at the opposite terminals of the bi-directional switch 410 does not increase sharply, but increases slowly as a sine wave. Here, some of the energy may be stored in the mutual inductance Lm, and the electric current flowing in the bi-directional switch 410 may be gradually reduced to 0 (zero) and the voltage of the bi-directional switch 410 may increase gradually from 0 (zero voltage switching turn off).

FIG. 7 shows a process of resetting the energy stored in the mutual inductance of the multi-winding transformer 420 when the bi-directional switches 410 of the two modules module-1 and module-8 are opened. When the energy stored in the mutual inductance Lm increases, the voltage of the mutual inductance Lm may increase. When the voltage of the mutual inductance Lm of the multi-winding transformer 420 increases, the voltage of the mutual inductor 432 of the reset circuit 430 that is correlated with the mutual inductance Lm of the multi-winding transformer 420 may also increase. When the voltage of the mutual inductor 432 of the reset circuit 430 increases to be greater than the voltage at the opposite terminals of the entire modules (that is, the voltage at the opposite terminals of the modules that are connected in series), the electric current may flow in the reset circuit 430 via the diode 431. Therefore, the voltage at the mutual inductance Lm of the multi-winding transformer 420 does not increase any more, and then, the voltage at the bi-directional switch 410 does not increase, and the bi-directional switch 410 has the peak voltage. Here, a polarity of the mutual inductance of the reset circuit 430 may be opposite to that of the mutual inductance Lm of the multi-winding transformer 420.

FIG. 8 shows a case where the electric current does not flow in the reset circuit 430 any more when the bi-directional switches 410 of the two modules module-1 and module-8 are turned off. When the electric current does not flow in the reset circuit 430, a resonant circuit is formed between the output capacitor of the SR-NMOS 411 and the mutual inductance Lm. Therefore, the voltage at the bi-directional switch 410 may be gradually reduced, and the output capacitor and the mutual inductance Lm are adjusted so that the voltage of the bi-directional switch 410 becomes 0 before the bi-directional switch 410 is turned on (zero voltage switching turn on).

Figure 9:
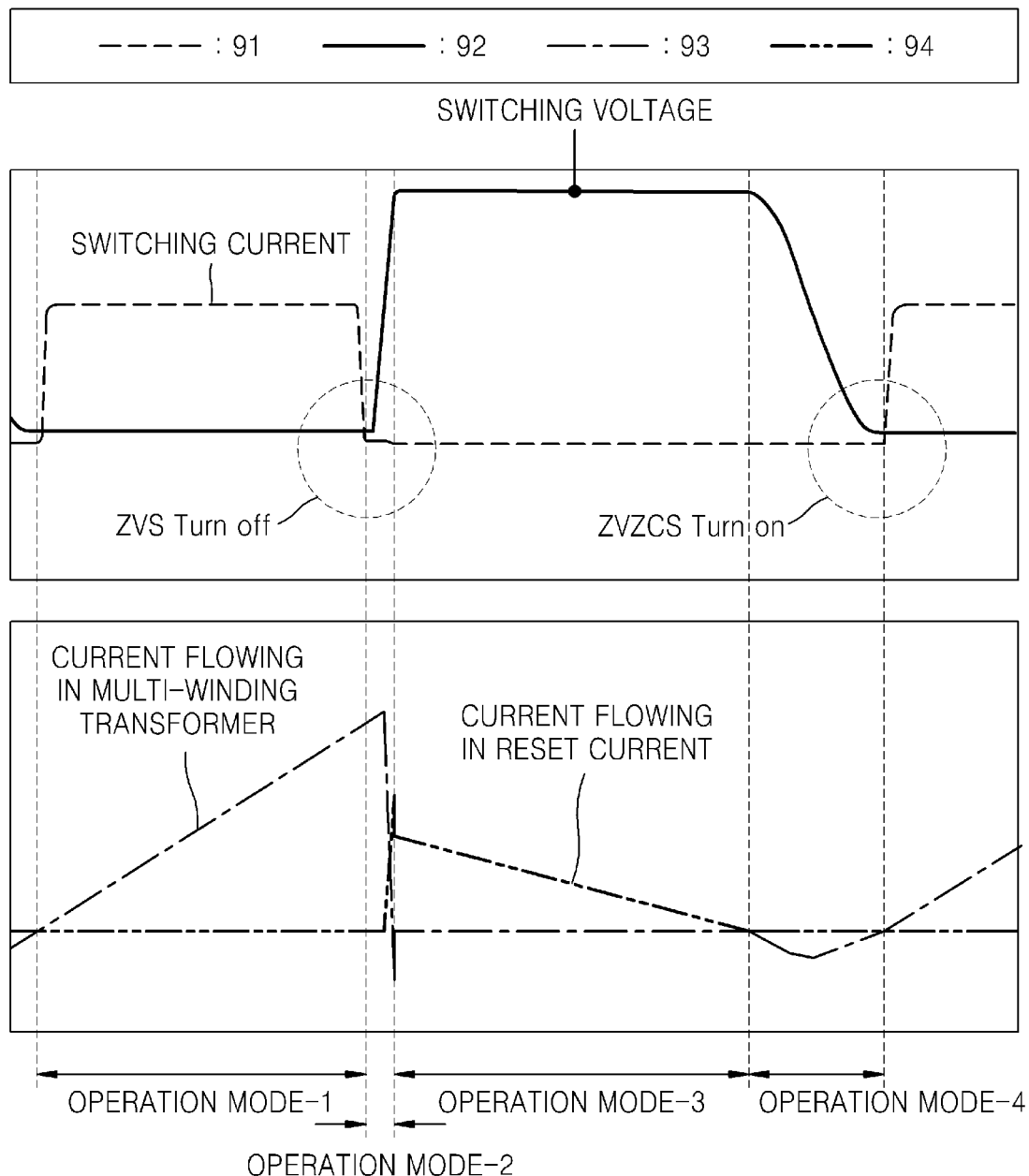
FIG. 9 is a graph illustrating an operation of the battery system shown in FIG. 4.

FIG. 9 is a diagram illustrating operations of the battery system 400 shown in FIG. 4. The above descriptions about the battery system 400 described with reference to FIG. 4 also apply to FIG. 9, even though omitted below.

An operation mode-1 denotes an operation of the battery system 400 in FIG. 5, an operation mode-2, an operation mode-3, and an operation mode-4 respectively denote the operation of the battery system 400 in FIGS. 6, 7, and 8.

The operation mode-1 is the operation of the battery system 400 when the bi-directional switch 410 is closed. In the operation mode-1, a switching current 91 is increased from 0 (zero) and is maintained at a constant value, and a switching voltage 92 is maintained at 0 since the bi-directional switch 410 is closed. A current 93 flowing in the multi-winding transformer 420 constantly increases, and a current 94 flowing in the reset circuit 430 is 0. The switching current 91 is reduced to 0 before the bi-directional switch 410 is turned off. The switching current 91 denotes the electric current flowing in the bi-directional switch 410 connected to each of the modules.

The operation mode-2 is the operation of the battery system 400 right after the bi-directional switch 410 is opened. In the operation mode-2, the switching current 91 is reduced to 0 before the bi-directional switch 410 is turned off, and is maintained at 0 when the bi-directional switch 410 is in a turned off state. The switching voltage 92 increases when the bi-directional switch 410 is turned off, and reaches a peak at a desired (and/or alternatively predetermined) level. The current 93 flowing in the multi-winding transformer 420 is increased, and the current 94 flowing in the reset circuit 430 is maintained at 0 (zero).

The operation mode-3 is the operation of the battery system 400 when the voltage of the mutual inductor 432 of the reset circuit 430 is greater than the voltage at the opposite terminals of the entire modules. In the operation mode-3, the switching current 91 is maintained at 0 and the switching voltage 92 is maintained at the peak. The current 93 flowing in the multi-winding transformer 420 is maintained at 0 when the current starts to flow in the reset circuit 430, and the current 94 flowing in the reset circuit 430 is gradually reduced after being increased. The switching voltage 92 is the voltage at opposite terminals of the bi-directional switch 410 connected to each module.

The operation mode-4 is the operation of the battery system 400 when the current does not flow in the reset circuit 430 any more. In the operation mode-4, the switching current 91 is maintained at 0, and the switching voltage 92 is gradually reduced to 0 before the bi-directional switch 410 is closed again (zero voltage zero current switching turn on). The current 93 flowing in the multi-winding transformer 420 flows in an opposite direction to that in the operation mode-1, and is reduced to 0 before the bi-directional switch 410 is closed again. The current 94 flowing in the reset circuit 430 is maintained at 0.

The battery system 400 measures voltages of the modules for a desired (and/or alternatively predetermined) period, and closes the switches of the selected modules for a desired (and/or alternatively predetermined) time period. Therefore, in order to operate as shown in FIG. 6, the battery system 400 is designed to operate based on a time of opening and closing the switches. In more detail, the output capacitor and the mutual inductor included in the battery system 400 are designed in consideration of the period of measuring the voltages and the time period in which the switches of the selected modules are closed.

FIGS. 10 through 13 are example diagrams of the battery system 100 of FIG. 1 according to some example embodiments.

Figure 10:
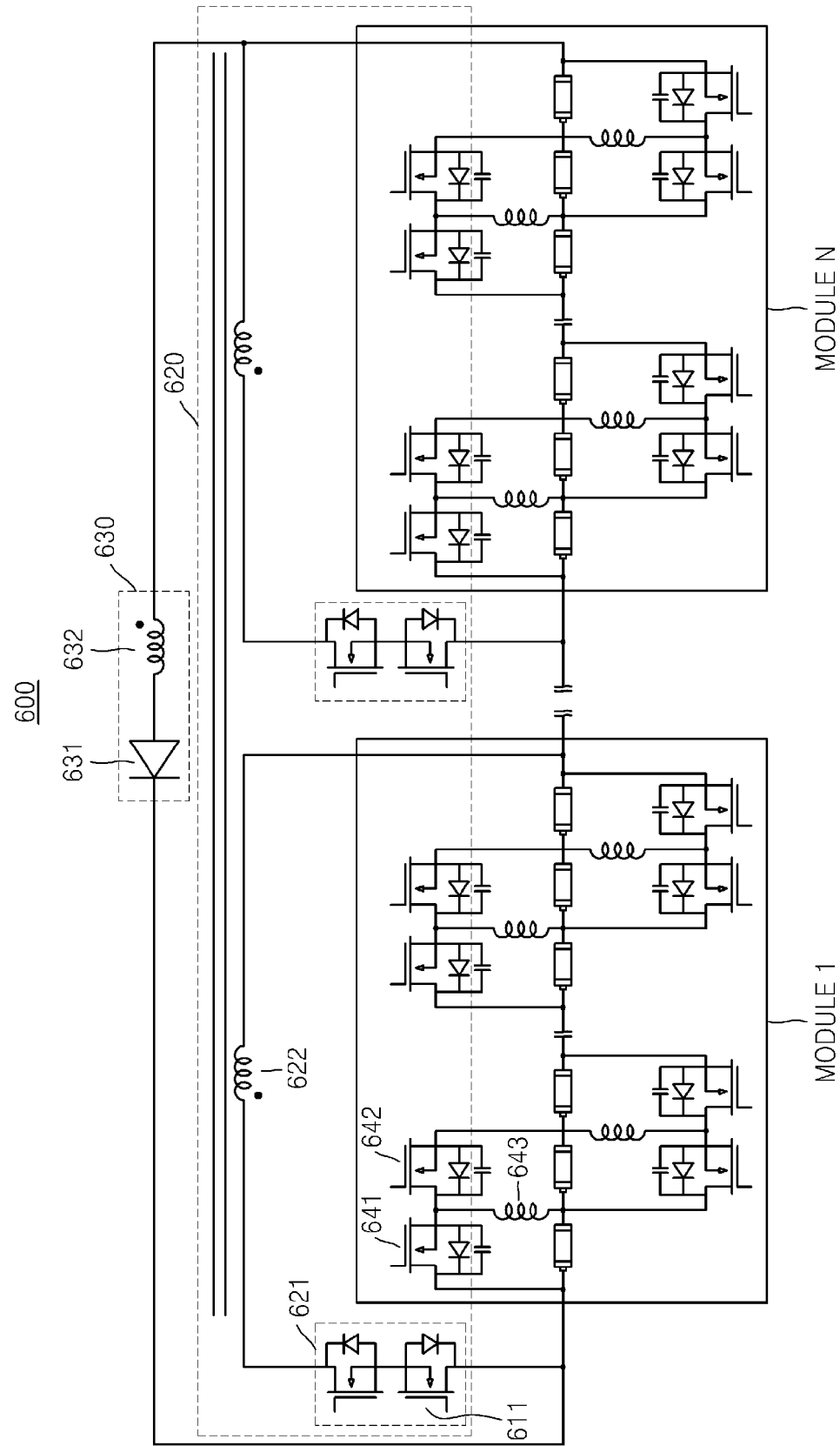
FIGS. 10 through 13 are example diagrams of the battery system of FIG. 1 according to some example embodiments.

Referring to FIG. 10, according to an example embodiment, a battery system 600 includes a multi-winding transformer 620 and a reset circuit 630 for performing the balancing between the modules, and includes a bi-directional buck-boost converter for performing the balancing between the cells. The reset circuit includes a diode 631 and a mutual inductor 632. The multi-winding transformer 620 includes mutual inductors 622. Bi-directional switches 621 are connected between modules (e.g., Module 1, Module N) and the multi-winding transformer 620 respectively. The bi-directional switches 621 may include two transistors 611 having a built-in diode. In the modules (e.g., Module 1, Module N), switches 641 and 642 may be connected to opposite terminals of every two adjacent cells, and energy storage devices 643 may be connected between the switches 641 and 642 and two adjacent cells, respectively. The switches 641 and 642 may be transistors having built-in diode and capacitor components, similar and/or the same as the SR-NMOS 411 in FIG. 4. The energy storage device 643 may be an inductor. The battery system 600 may perform the balancing of the modules and the balancing of the cells at the same time. The method of balancing the modules by using the multi-winding transformer 620 and the reset circuit 630 is described with reference to FIGS. 4 through 9, and the method of balancing the cells by using the bi-directional buck-boost converter is described with reference to FIG. 3. Thus, detailed descriptions are omitted here.

Figure 11:
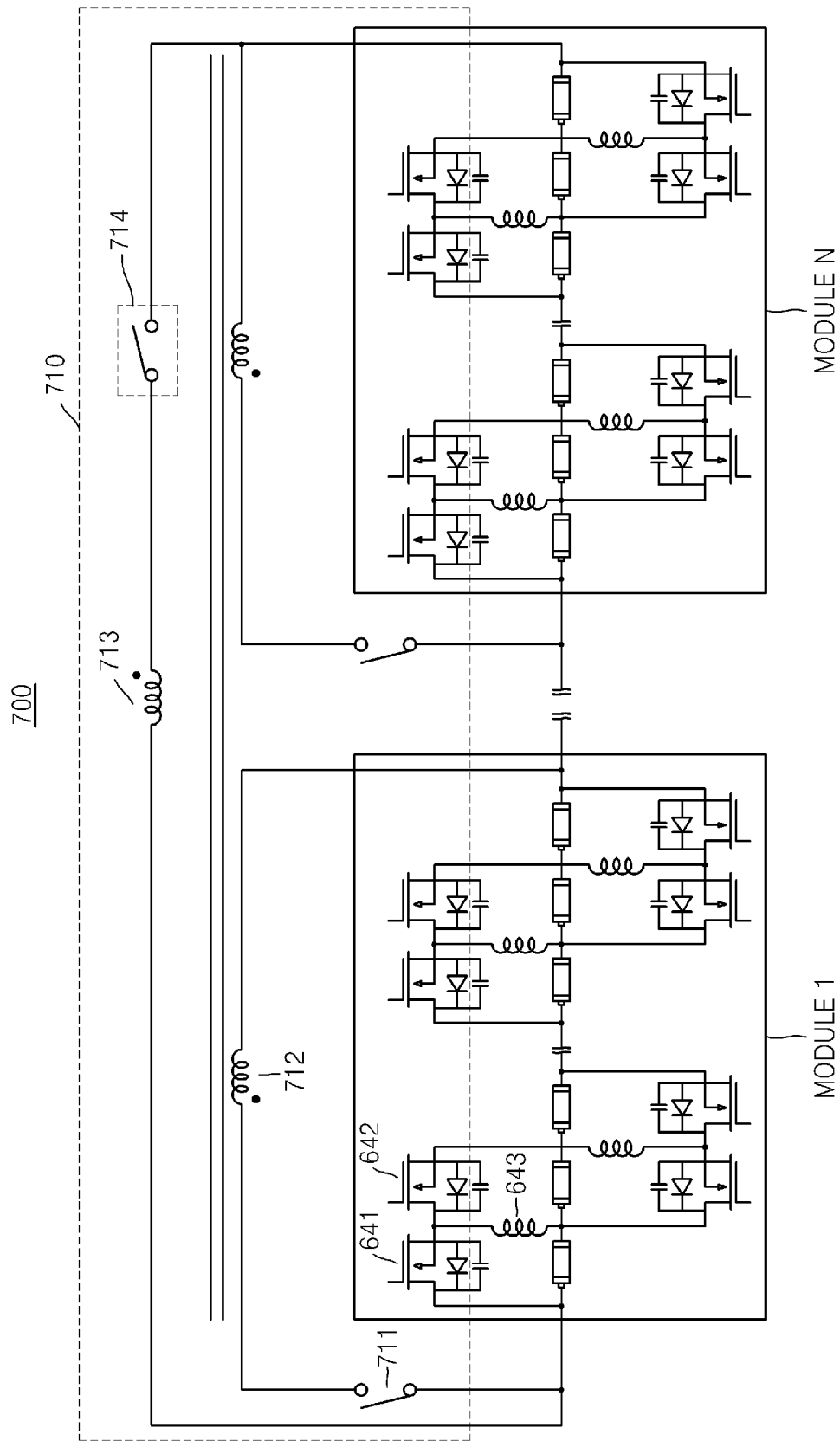

FIG. 11 shows another example of the battery system 100 shown in FIG. 1. Referring to FIG. 11, according to an example embodiment, a battery system 700 may perform the balancing of the modules by using a multi-winding bidirectional flyback converter 710, and performs the balancing of the cells by using a bidirectional buck boost converter. The method of balancing the cells by using the bidirectional buck-boost converter is described in detail with reference to FIG. 3, and detailed descriptions thereof are not provided here.

The multi-winding bidirectional flyback converter 710 includes a switch 711 and a mutual inductor 712 connected to each of the modules in parallel, and a mutual inductor 713 and a switch 714 connected to all the modules in parallel. The mutual inductors 712 connected to the modules have the same polarities as each other. The mutual inductor 712 connected to each module and the mutual inductor 713 connected to the entire modules have the opposite polarities to each other.

Although not shown in FIG. 11, the battery system 700 includes a voltage measuring unit for measuring voltages of the modules and the cells, and a controller controlling each of the switched based on the measured voltages.

There are two ways of controlling the operations of the battery system 700 (control method 1 in which the switches are constantly controlled in the charging and discharging states of the battery and control method 2 in which the switches are controlled differently according to states such as the charging and discharging states).

<Control Method 1>

1. The controller selects a module having the highest voltage and turns on the switch connected to the selected module, and turns off the switches connected to remaining modules and the switch connected to the entire modules. Here, the energy is transferred from the module having the largest voltage to the mutual inductor connected to the module having the largest voltage.

2. When the controller turns off the switch of the module having the largest voltage and turns on the switch connected to the entire modules, the energy stored in the mutual inductor is transferred to the entire modules.

3. When the controller turns on the switch connected to the entire modules and turns off the module switch, the energy from the entire modules is transferred to the mutual inductor connected to the entire modules.

4. When the controller turns off the switch connected to the entire modules and turns on the module having the lowest voltage, the energy stored in the mutual inductor connected to the entire modules is transferred to the module having the lowest voltage.

<Control Method 2>

1. In a normal state of the battery, the controller performs the same operations as those of the control method 1.

2. In a charged state of the battery, the controller performs processes 1 and 2 in the control method 1 with respect to the module having the largest voltage.

3. In a discharged state of the battery, the controller performs processes 3 and 4 in the control method with respect to the module having the lowest voltage.

Figure 12:
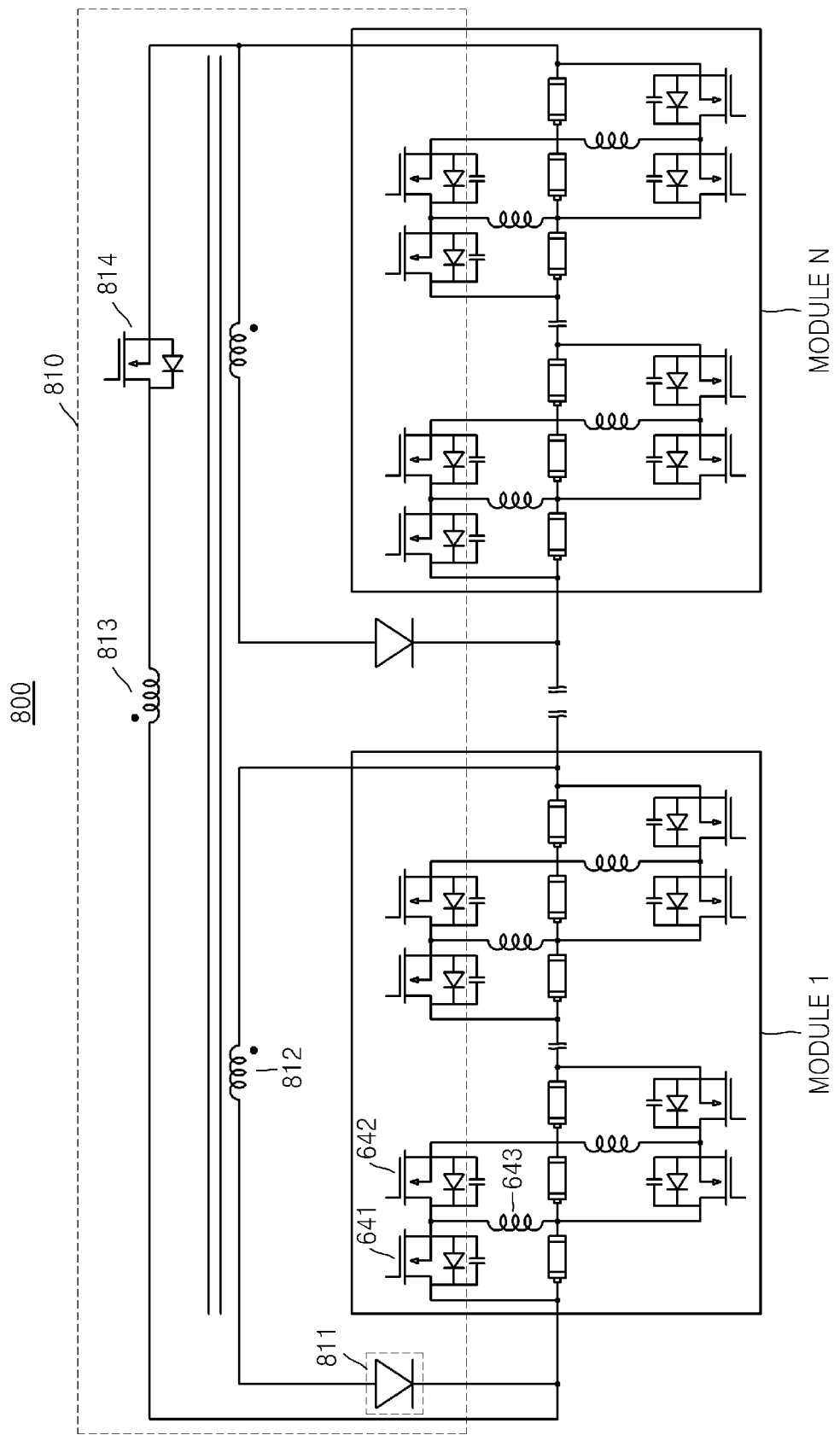

FIG. 12 is a diagram of an example of the battery system 100 shown in FIG. 1. Referring to FIG. 12, according to an example embodiment, a battery system 800 may perform the balancing of the modules by using a multi-winding flyback converter 810, and performs the balancing of the cells by using a bidirectional buck boost converter. The method of balancing the cells by using the bidirectional buck-boost converter is described in detail with reference to FIG. 3, and detailed descriptions thereof are not provided here.

The multi-winding flyback transformer 810 includes a switch 811 and a mutual inductor 812 connected to each of the modules in parallel, and a mutual inductor 813 and a switch 814 connected to all the modules in parallel. The mutual inductors 812 connected to the modules have the same polarities as each other. The mutual inductor 812 connected to each module and the mutual inductor 814 connected to the entire modules have the opposite polarities to each other. The switch 811 may be a diode, as shown in FIG. 12. But, one of ordinary skill in the art would appreciate that the switch 811 is not limited thereto. For example, the switch 811 could be a transistor.

Although not shown in FIG. 12, the battery system 800 includes a voltage measuring unit for measuring voltages of the modules and the cells, and a controller controlling each of the switched based on the measured voltages.

In the battery system 800 of FIG. 12, when the controller turns on the switch 814, the energy is transferred to the mutual inductor 813. When the controller turns off the switch 814, the energy stored in the mutual inductor 813 is transferred to each of the modules via the mutual inductors 812 connected to the modules. Here, more energy is transferred to the modules having lower voltages.

Figure 13:
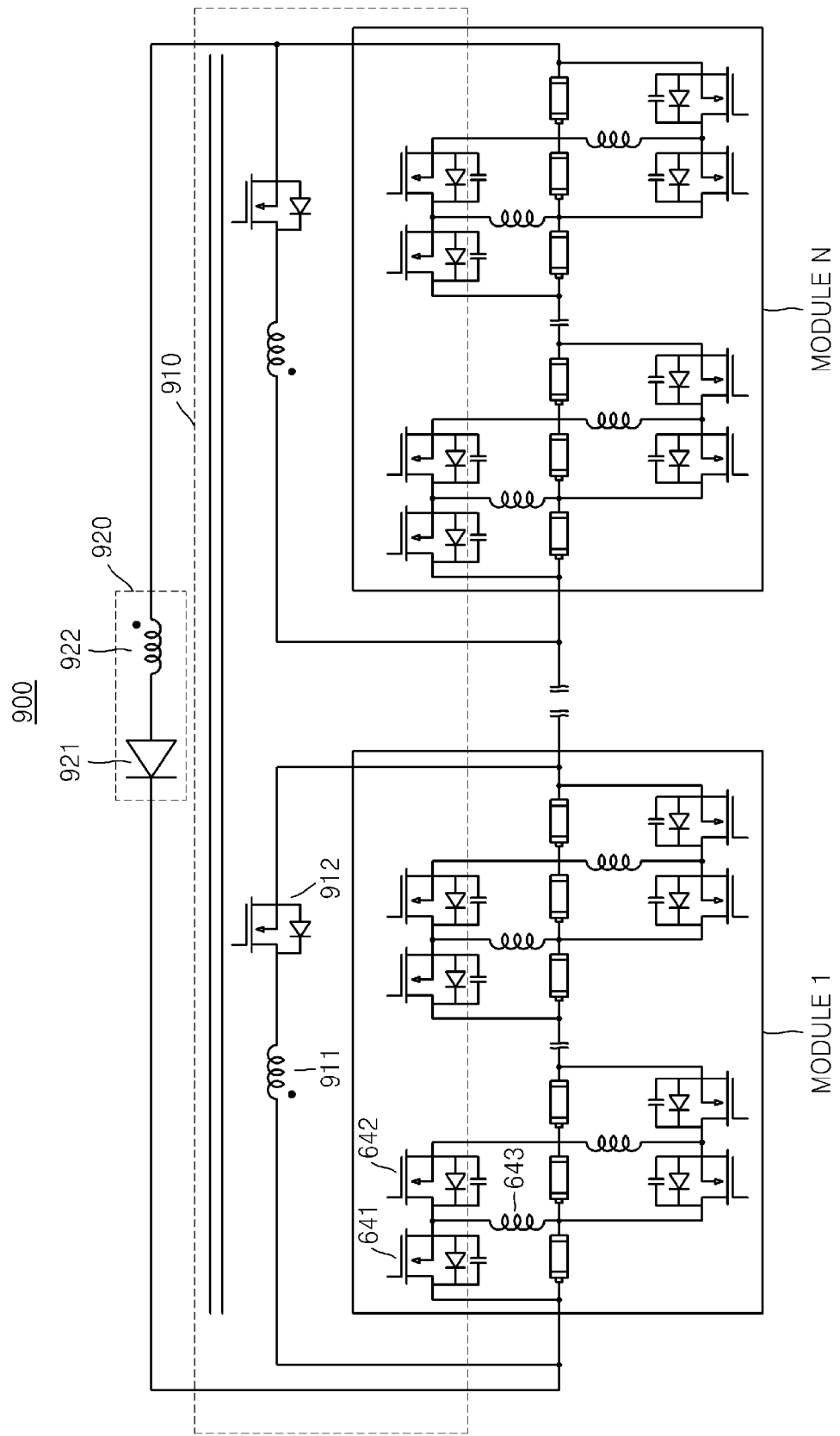

FIG. 13 is a diagram showing an example of the battery system 100 shown in FIG. 1. Referring to FIG. 13, according to an example embodiment, a battery system 900 performs the balancing of the modules by using a multi-winding forward converter 910 and a reset circuit 920, and performs the balancing of the cells by using a bidirectional buck boost converter. The method of balancing the cells by using the bidirectional buck-boost converter is described in detail with reference to FIG. 3, and detailed descriptions thereof are not provided here. The reset circuit 920 includes a diode 921 and an inductor 921.

The multi-winding forward converter 910 includes a switch 912 and a mutual inductor 911 connected to each of the modules in parallel. The switch 912 includes a built-in diode.

The reset circuit 920 includes a mutual inductor 922 and a diode 921 connected to entire modules in parallel. The mutual inductors 911 connected to the modules have the same polarities as each other. The mutual inductor 911 connected to each module and the mutual inductor 922 connected to the entire modules 922 have the opposite polarities from each other.

Although not shown in FIG. 13, the battery system 900 includes a voltage measuring unit for measuring voltages of the modules and the cells and a controller controlling the switched based on the measured voltages.

In the battery system 900 of FIG. 13, when the controller turns on the switch of the module having the largest voltage and turns off the switched of the other modules, the energy is transferred from the module having the largest voltage to the other modules via the built-in diodes of the switches. When the controller turns off the switch of the module having the largest voltage, the energy stored in the mutual inductor 911 of the modules is transferred to the entire modules via the mutual inductor 922 connected to the entire modules. That is, an electric current flows in the reset circuit 920.

Figure 14:
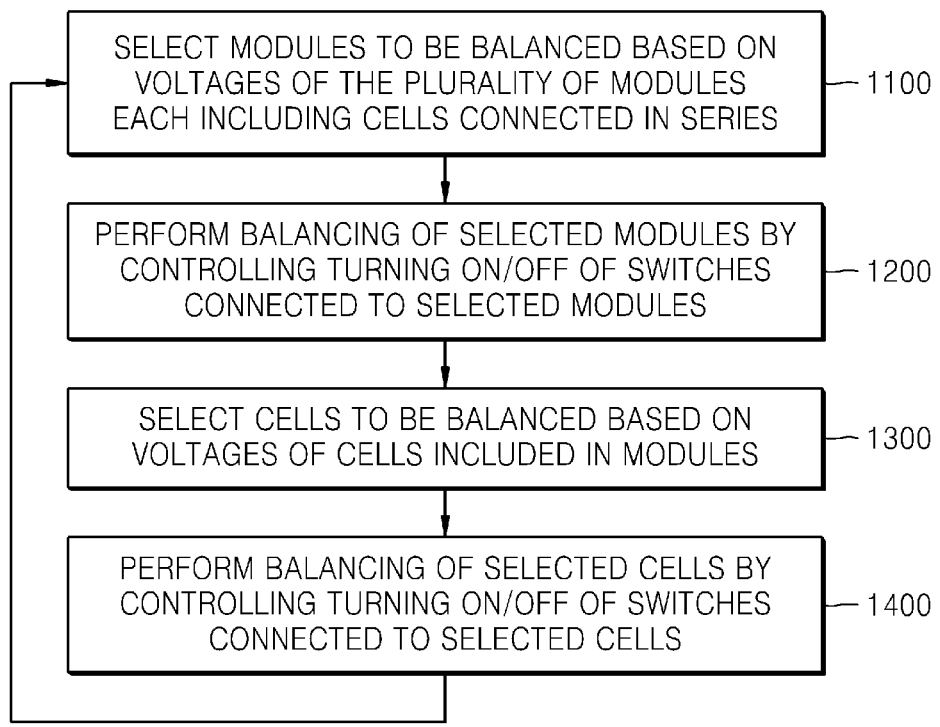
FIG. 14 is a flowchart illustrating operations of the battery system shown in FIG. 1.

FIG. 14 is a flowchart illustrating operations of the battery system 100 shown in FIG. 1. Therefore, even though omitted, the above descriptions about the battery system 100 also apply to the method of FIG. 14.

In operation 1100, the module balancing circuit 110 selects modules that are to be balanced from a plurality of modules based on the voltages of the plurality of modules. The plurality of modules each include a desired (and/or alternatively predetermined) number of cells that are connected in series.

In operation 1200, the module balancing circuit 110 controls turning on/turning off of the switches that are connected to the selected modules to perform balancing operation of the selected modules.

In operation 1300, the cell balancing circuit 130 selects cells to be balanced based on the voltages of the cells included in the modules.

In operation 1400, the cell balancing circuit 130 controls turning on and turning off the switches that are connected to the selected cells to perform balancing operation of the selected cells.

Some example embodiments may be written as computer programs and can be implemented in general-use digital computers that execute the programs using a computer-readable recording medium. Examples of the computer-readable recording medium include magnetic storage media (e.g., ROM, floppy disks, hard disks, etc.), and optical recording media (e.g., CD-ROMs, or DVDs).

The battery system may be used to balance the cells in a battery including the plurality of cells that are connected with each other in series. For example, the battery system may be applied to electric vehicles, hybrid electric vehicles, electric bikes, uninterruptible power supplies, or portable appliances.

The balancing between the modules and the balancing between the cells included in the modules may be performed simultaneously, and thus, efficiency in the balancing operation may be improved.

The balancing between the cells is performed by using the buck booster converter that is small-sized, easily controlled, and cheap, and the balancing between the modules is performed by the multi-winding transformer to transfer the energy between the modules that are not adjacent to each other. Therefore, according to some example embodiments, advantages of the buck booster circuit and the multi-winding transformer may be achieved, the circuit of low price and high efficiency with a small volume may be realized when being compared with the conventional cell balancing method in the large capacity battery in which a plurality of cells are connected in series. Also, the circuit may be easily controlled and designed.

The modules or the cells that are not adjacent to each other may be balanced by using the multi-winding transformer.

The energy is directly transferred between the modules or the cells by using the multi-winding transformer, and thus, energy loss may be reduced.

The loss of energy caused when turning on and turning off the bidirectional switch may be reduced by adjusting the capacitance of the bidirectional switch and the inductance of the multi-winding transformer.

An over-voltage applied at the opposite terminals of the bidirectional switch may be prevented by adjusting the number of windings of the multi-winding transformer.

It should be understood that example embodiments described herein should be considered in a descriptive sense only and not for purposes of limitation. Descriptions of features or aspects within each example embodiment should typically be considered as available for other similar features or aspects in other example embodiments. Accordingly, while some example embodiments have been particularly shown and described, it will be understood by one of ordinary skill in the art that variations in form and detail may be made therein without departing from the spirit and scope of the claims.

What is claimed is:

1. A battery system comprising:
a plurality of modules, each of the plurality of modules including a plurality of cells connected in series and a cell balancing circuit,
the cell balancing circuit being configured to measure voltages of the plurality of cells,
the cell balancing circuit being configured to select a first number of the plurality of cells for cell balancing based on the voltages of the plurality of cells; and
a module balancing circuit configured to measure voltages of the plurality of modules,
the module balancing circuit being configured to select a second number of the plurality of modules for module balancing based on the voltages of the plurality of modules,
the module balancing circuit including,
bi-directional switches that are respectfully connected to the plurality of modules, the bi-directional switches being configured to hi-directionally control a flow of an electric current,
a module controller configured to determine the selected second number of modules for module balancing based on the voltages of the plurality of modules, the module controller being configured to turn on and turn off a selected number of the bi-directional switches that are connected to the selected modules, and
a multi-winding transformer connected to the bi-directional switches, the multi-winding transformer being configured to transfer energy between the selected modules when a selected number of the bi-directional switches are turned on, the selected number of bi-directional switches corresponding to the selected modules.

2. The battery system of claim 1, wherein
the plurality of modules are connected in series,
the multi-winding transformer includes an inductor;
the module balancing circuit further includes a reset circuit connected to opposite terminals of the plurality of modules, and
the reset circuit includes a diode and a mutual inductor that is correlated with the inductor of the multi-winding transformer.

3. The battery system of claim 2, wherein
an impedance of the mutual inductor in the reset circuit is greater than an impedance of the plurality of the modules, and
a number of windings of the mutual inductor in the reset circuit is greater than a number of windings of the inductor in the multi-winding transformer.

4. The battery system of claim 1, wherein the module balancing circuit is configured to determine the selected modules based on selecting a module having a highest voltage and selecting a module having a lowest voltage among the plurality of modules.

5. The battery system of claim 1, wherein the module controller is configured to determine the selected modules according to a priority that is set by the module controller.

6. The battery system of claim 5, wherein the module controller is configured to determine the selected modules based on a connecting order of the plurality of modules when at least two of the plurality of modules have equal voltages.

7. A battery system comprising:
a plurality of modules, each of the plurality of modules including a plurality of cells connected in series and a cell balancing circuit,
the cell balancing circuit being configured to measure voltages of the plurality of cells,
the cell balancing circuit being configured to select a first number of the plurality of cells for cell balancing based on the voltages of the plurality of cells,
the cell balancing circuit including a buck booster circuit; and
a module balancing circuit configured to measure voltages of the plurality of modules,
the module balancing circuit being configured to select a second number of the plurality of modules for module balancing based on the voltages of the plurality of modules, and
the module balancing circuit including a multi-winding transformer.

8. The battery system of claim 7, wherein the multi-winding transformer includes mutual inductors having an equal number of windings as each other.

9. The battery system of claim 7, wherein the cell balancing circuit includes,
two switches connected to opposite terminals of every two adjacent cells in parallel, and
an energy storage device connected between the two adjacent cells and the two switches.

10. A balancing method of a battery system, the method comprising:
measuring voltages of a plurality of modules;
selecting a first number of the plurality of modules for module balancing based on the voltages of the plurality of modules,
the selecting the first number of the plurality of modules including one of,
determining the selected first number of the plurality of modules based on a priority set by a controller, and
determining the selected first number of the plurality of modules based on a connecting order of the plurality of modules when at least two of the plurality of modules have equal voltages,
each of the plurality of modules including a plurality of cells connected in series;
balancing the selected modules by controlling turning on and turning off switches that are connected to the selected modules;
selecting a second number of the plurality of cells for cell balancing based on voltages of the plurality of cells included in the plurality of modules; and
balancing the selected cells by controlling turning on and turning off switches connected to the selected cells.

11. The method of claim 10, wherein the selecting the first number of the plurality modules includes selecting two of the plurality of modules for module balancing based on measured voltages of the plurality of modules.

12. The method of claim 10, wherein the selecting the first number of the plurality of modules includes determining the selected first number of the plurality of modules based on the priority set by a controller.

13. The method of claim 10, wherein the selecting the first number of the plurality of modules includes determining the selected first number of the plurality of modules based on the connecting order of the plurality of modules when at least two of the plurality of modules have equal voltages.

14. The method of claim 10, wherein the selecting the second number of the plurality of cells includes selecting two adjacent cells for cell balancing based on measured voltages of the cells.

15. A tangible computer readable recording medium having embodied thereon a program for executing the method of claim 10 in a computer.

* * * * *